May 2, 1961  A. R. WILSHUSEN  2,982,047
SPRING-LOADED FISH HOOKS
Filed Dec. 11, 1959

Albert R. Wilshusen
INVENTOR.

United States Patent Office 2,982,047
Patented May 2, 1961

2,982,047

SPRING-LOADED FISH HOOKS

Albert R. Wilshusen, Box 85, Tyrone, Okla.

Filed Dec. 11, 1959, Ser. No. 858,980

6 Claims. (Cl. 43—36)

The present invention relates to improved fish hooking and catching means often referred to in the art as multiple expansible and contractible trap hooks where, for example, a pair of hooks are normally latched together when the device is set and spring apart simultaneously when the device has been triggered into action.

As the preceding general statement of the invention suggests, there are many and varied styles and forms to forcibly spread twin hooks existing in the prior art. The object of the instant invention is to solve the problem by resorting to a different line of thinking and, in doing so, to provide a structurally distinct adaptation which, it is believed, will better serve the purposes for which spring-loaded twin-type fish hooks are presently being employed.

In carrying out the spring-loaded construction herein under advisement two similarly constructed and performing fish hooks are utilized. The shank of one hook is fixedly secured to and alongside of one spreadable limb of a generally V-shaped spring unit. The other hook is slidingly attached to the other limb of said device or unit and is equipped with an easily triggered retaining latch, said latch being releasably connectible with a free end portion of the first-named limb.

These together with other objects and advantges which will become subsequently apparent reside in the details of construction and operation as more fully hereinafter described and claimed, reference being had to the accompanying drawings forming a part hereof, wherein like numerals refer to like parts throughout, and in which:

Figure 1:
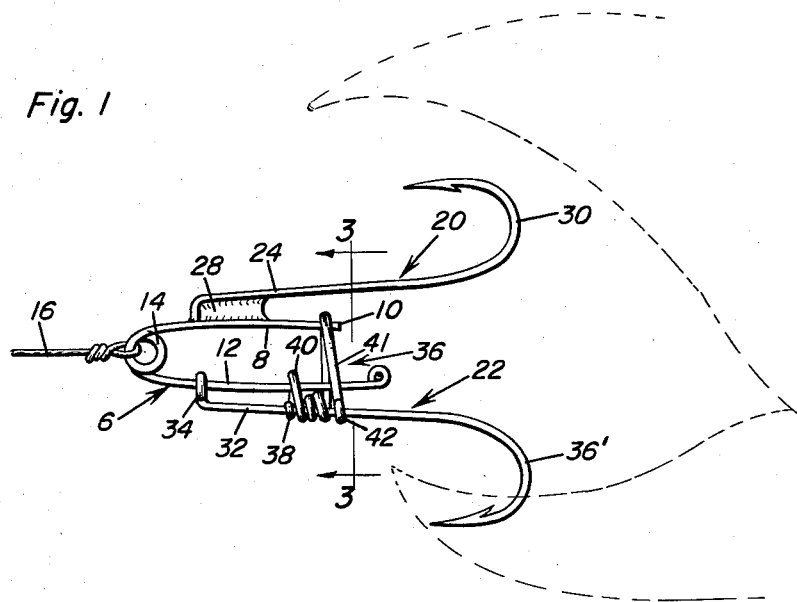
Fig. 1 is a view in side elevation of a spring-loaded fish hook construction constructed in accordance with the principles of the invention and showing the same set.
Figure 2:
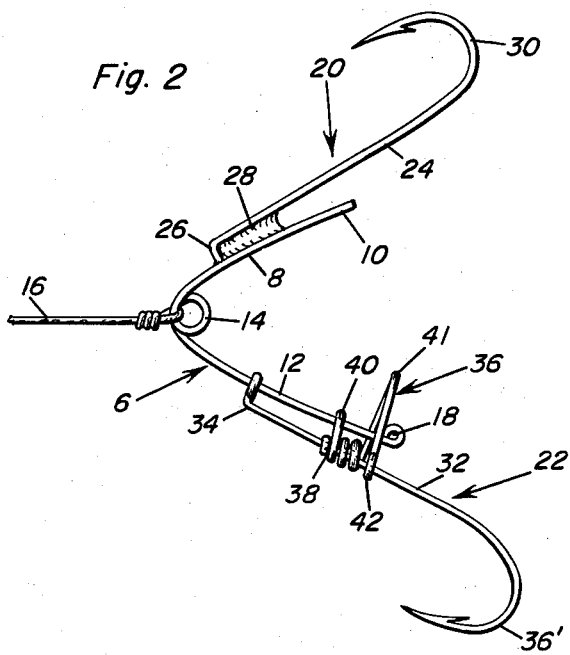
Fig. 2 is a view like Fig. 1 but showing the relationship of the parts when the device has been sprung with a view toward setting the hooks forcibly in the mouth of the fish.

The aforementioned spring device or unit, which is of general V-shaped form, is denoted by the numeral 6 and it comprises a one-piece component having an upper limb (upper in the drawing) denoted by the numeral 8 and provided with a free end portion 10 constituting a keeper. The limb 8 joins the slightly longer companion limb 12 by way of a coiled spring 14 providing an eye to which the fishing line 16 is connected. The free end of the limb 12 is bent upon itself to provide a stop shoulder 18.

Figure 3:
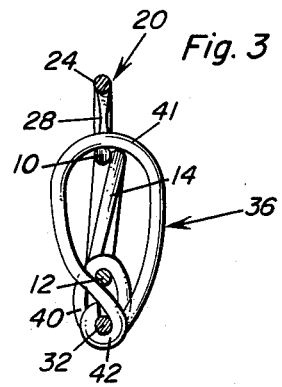
Fig. 3 is a section on the vertical line 3—3 of Fig. 1.

As already suggested two conventional type barbed fish hooks are employed and are carried by the spring unit 6. The upper relatively stationary fish hook is denoted at 20 and the pull actuated relatively movable lower fish hook is denoted at 22. The hook 20 has a shank 24 which is spaced from and substantially parallel to the limb 8 and has an end portion 26 which is welded or otherwise joined to the limb 8 as at 28. The connection is located between the ends of the limb 8 at the median portion thereof. The free end portion 10 projects in a manner to provide a satisfactory keeper. It might be mentioned here that the keeper may be straight or could be bent up or down or sideways (not shown) to regulate the tripping and releasing action in a manner to be clarified. The hook proper with the barb thereon is denoted at 30 and extends to a position well beyond the keeper 10. The shank portion 32 of the hook 22 also parallels the limb 12 and it has a laterally bent eye 34 slidably embracing the limb 12. The barbed hook 36' extends well beyond the stop shoulder 18 to coact with the hook 20. The hook 22 is slidable but it should be preferably keyed in such a way that it occupies the operating relationship depicted in the drawing. This can be accomplished by the use of a suitably bent length of wire providing a latching device 36. For example, the convolutions or coils 38 are securely wrapped or bent around the shank 32 and one enlarged and bent portion 40 is slidably engageable with the limb 12. The other larger bent portion is of loop-like form as seen in Fig. 3 and is denoted by the numeral 41 and provides a latch or catch and there is an eye 42 at the free end which securely embraces the limb 32. In other words, this device 36 may be thought of as fixed on the median portion of the limb 32 so that it works back and forth with said hook 22. The crotch or bent portion of the catch may be releasably engaged over the keeper 10 in the manner seen in Fig. 1. In so doing the spring unit 6 is compressed, that is limbs 10 and 12 are pressed together in ready-to-expand relationship. The limbs are held in this position by the pull released catch or latch 36 particularly by the loop-shaped portion which is the latch proper and which engages the keeper in the manner illustrated. Assuming that the hooks have been baited it will be evident that if a fish takes the hook in the manner generally designated in phantom lines in Fig. 1 any effort to get off the hook will of course move the relatively shiftable hook 22 relative to the limb 12 and limb 8 whereupon the latch is automatically released and the spring comes into play forcibly spreading the hooks apart and to make the catch in the manner shown and described.

It is within the purview of the concept to employ either one or two hooks. For instance it is evident that it would be commercially desirable and perhaps practical under certain circumstances to omit the fish hook 20. In this event the single relatively movable and trippable hook 22 would suffice to perform a reasonably satisfactory trapping job.

It is also a matter of moment to mention that assuming that two fish hooks 20 and 22 are being used it would be within the sphere of the invention to so construct the hook 22 that it may be replaced by another hook for example a small or larger hook all depending on the desire of the manufacturer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A baitable fish hooking and catching device, comprising in combination a spring unit having first and second limbs resiliently urged apart, a first hook having a shank secured in spaced and substantially parallel relation to the first limb of said spring unit, a second hook slidably mounted on the second limb of the spring unit, and a loop provided on the shank of the second hook and slidable therewith, the length of said first limb being materially less than the length of the shank of the first hook and the first limb having a free end portion spaced from the shank of the first hook to provide a detent, said loop embracing freely the second limb of said spring unit and being adapted to be placed over said detent to hold said hooks drawn together and released from the detent upon sliding of the second hook on the second limb to permit the hooks to be sprung apart by the action of said spring unit.

2. The device as defined in claim 1 wherein said spring unit is substantially V-shaped and includes a line attaching eye having said first and second limbs connected thereto.

3. The device as defined in claim 1 together with a stop element provided at the free end of said second limb to limit sliding of said second hook on the latter.

4. A baitable fish hooking and catching device, comprising in combination a substantially V-shaped spring unit including first and second limbs and a line attaching eye having said limbs connected thereto, a first hook having a shank spaced from and substantially parallel to said first limb, means securing the shank of the first hook to an intermediate portion of the first limb, the length of the first limb being materially less than the length of the shank of the first hook and the first limb having a free end portion spaced from the shank of the first hook to provide a detent, a second hook having a shank disposed in spaced and substantially parallel relation to said second limb, a relatively small loop rigidly secured to the shank of the second hook and slidable on said second limb, and a relatively large loop rigidly secured to an intermediate portion of the shank of the second hook and freely embracing the second limb, said relatively large loop being adapted to be placed over said detent to hold said hooks drawn together and released from the detent upon sliding of the second hook relative to the second limb to permit the hooks to be sprung apart by the action of said spring unit.

5. The device as defined in claim 4 together with a stop element provided at the free end of said second limb, said stop element being engageable by said relatively small loop to limit sliding of the second hook relative to the second limb.

6. In a baitable fish hooking and catching device, the combination of a substantially V-shaped spring unit including first and second limbs and a line attaching eye having said limbs connected thereto, said first limb having a free end portion constituting a detent, a hook slidably mounted on said second limb, and a loop provided on the shank of said hook, said loop freely embracing said second limb and being adapted to be placed over said detent to hold said hook drawn toward the first limb and released from the detent upon sliding of the hook relative to the second limb to permit the hook to spring away from the first limb by the action of said spring unit.

References Cited in the file of this patent

UNITED STATES PATENTS

| | | |
|---|---|---|
| 44,368 | Gardner, Jr. | Sept. 20, 1864 |
| 825,639 | Curtis | July 10, 1906 |
| 1,591,640 | Middleton | July 6, 1926 |
| 2,474,481 | Kleppen et al. | June 28, 1949 |
| 2,608,786 | Schwartz | Sept. 2, 1952 |